United States Patent [19]

Gauthier et al.

[11] 4,222,750
[45] Sep. 16, 1980

[54] OXYGEN ENRICHMENT SYSTEM FOR MEDICAL USE

[75] Inventors: William D. Gauthier, Sylvania; Merl J. Hendricks, Pemberville; Robert L. Babcock, Toledo, all of Ohio

[73] Assignee: Champion Spark Plug Company, Toledo, Ohio

[21] Appl. No.: 714,782

[22] Filed: Aug. 16, 1976

[51] Int. Cl.² .......................................... B01D 53/04
[52] U.S. Cl. ........................................ 55/58; 55/62; 55/68; 55/74
[58] Field of Search ............... 55/25, 26, 33, 58, 62, 55/75, 163, 179, 389, 68

[56] References Cited

U.S. PATENT DOCUMENTS

| 3,176,444 | 4/1965 | Kiyonaga | 55/58 X |
| 3,225,518 | 12/1965 | Skarstrom et al. | 55/58 X |
| 3,237,377 | 3/1966 | Skarstrom | 55/58 X |
| 3,313,091 | 4/1967 | Berlin | 55/58 |
| 3,533,221 | 10/1970 | Tamura | 55/62 X |
| 3,710,547 | 1/1973 | Nelson | 55/58 |
| 3,719,025 | 3/1973 | Heinze et al. | 55/58 X |
| 3,880,616 | 4/1975 | Myers et al. | 55/62 |
| 3,891,411 | 6/1975 | Meyer | 55/58 X |
| 3,923,477 | 12/1975 | Armond et al. | 55/58 X |
| 3,957,463 | 5/1976 | Drissel et al. | 55/58 X |
| 4,013,429 | 3/1977 | Sircar et al. | 55/58 X |

FOREIGN PATENT DOCUMENTS 231705 3/1969 U.S.S.R. ........................................ 55/58

Primary Examiner—Robert H. Spitzer
Attorney, Agent, or Firm—Richard D. Emch; Oliver E. Todd, Jr.; Charles R. Schaub

[57] ABSTRACT

A method and apparatus for operating a two-bed oxygen enrichment system is disclosed in which the efficiency of the system is increased by first evacuating and then purging a bed of adsorbed gas using a short period of flow of a high purity gas.

2 Claims, 3 Drawing Figures

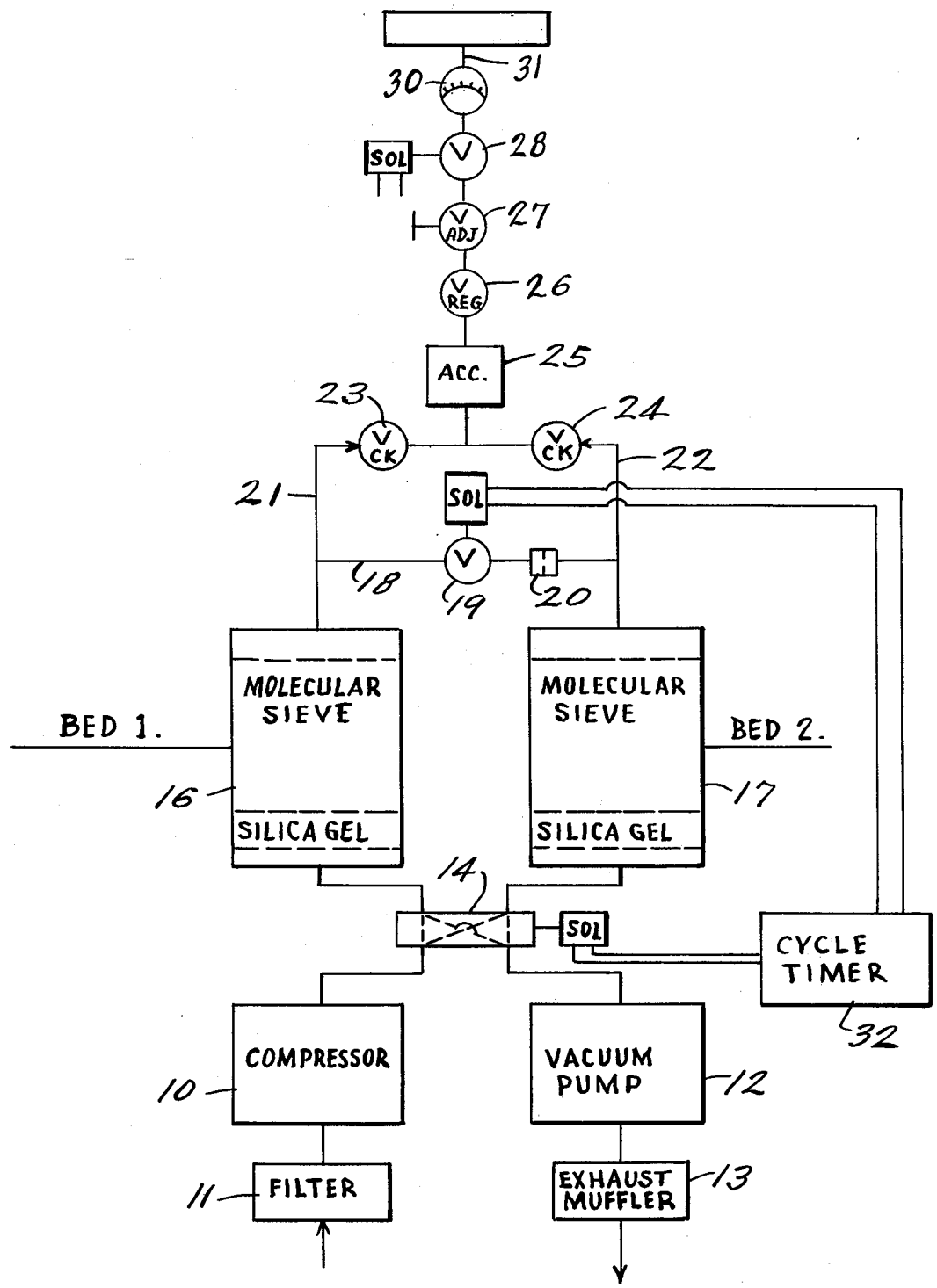
FIG-1-

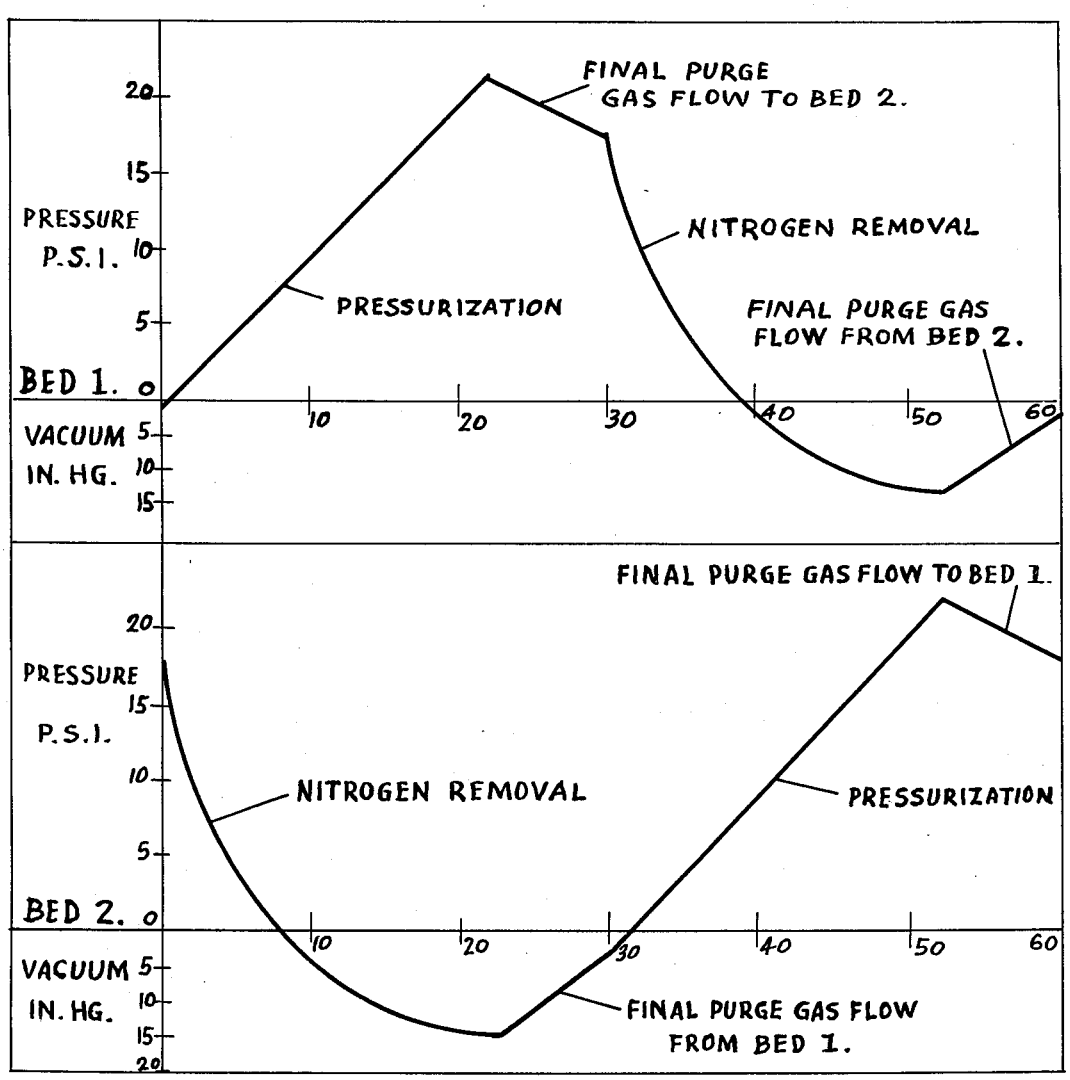
FIG-2-
FIG-3-

4,222,750

OXYGEN ENRICHMENT SYSTEM FOR MEDICAL USE

BACKGROUND OF THE INVENTION

It has heretofore been proposed to provide a process which makes it possible to obtain an oxygen enriched stream of gas suitable for those who need medical treatment. In some instances that process is used to provide a controlled atmosphere in an enclosed space such as an entire room in which the patient or patients may be seated. The known processes replace the use of pure bottled oxygen which is expensive and which requires extensive manipulation. Apparatus for carrying out the known processes, however, include several separate electrically operated valves, and the more valves used the more likely the system is to fail.

For nitrogen adsorption several molecular sieve adosrbents are known, including Type 5A. The molecular sieve adsorbent materials are packed into two cylindrical beds which are alternately used in a programmed cycle in which one bed is discharging an oxygen enriched primary effluent stream while the other bed is being purged of its adsorbed nitrogen by means including a diverted portion of the primary effluent stream. Such a process is disclosed in U.S. Pat. No. 3,280,536.

Silica gel is incorporated at the inlet of each bed to remove moisture that would reduce the nitrogen adsorbing capacity of the molecular sieve material.

Most of the conventional units do not utilize the compressor in a continuous cycle and therefore require either an air reservoir or a compressor unloader valve. Both of these expedients have the disadvantage that they are either bulky and expensive or noisy in operation.

BRIEF DESCRIPTION OF THE INVENTION

It has been found that the purity of an oxygen enriched primary effluent stream, and the efficiency of a two-bed system can be considerably enhanced by a novel cycle of operation in which the adsorbed bed containing nitrogen can be more efficiently purged by first evacuating the bed and delaying the onset of purging until a portion of the primary effluent stream has reached a high degree of purity. By placing the bed to be purged under a negative pressure and thereby extracting most of the adsorbed nitrogen and then utilizing a high purity purge gas, the final purging of a bed can be accomplished by reverse flow of the high purity gas in a matter of six to ten seconds, or from about 20% to 33% of the adsorption portion of the cycle time.

BRIEF DESCRIPTION OF THE DRAWINGS

FIG. 1 shows diagrammatically the apparatus required to practice the present invention; and FIGS. 2 and 3 are pressure-time diagrams.

Apparatus used to practice the present invention is shown in FIG. 1 and includes an air compressor 10 which takes air from the ambient atmosphere through a filter 11. Preferably the air compressor motor shaft is also utilized to drive a vacuum pump 12 which exhausts through a sound deadening muffler 13. Exhaust from the vacuum pump 12 takes place into the ambient atmosphere.

The output of the air compressor is connected to a four-way solenoid operated valve 14. In one position, the four-way valve connects the air compressor to a first tank or bed 16 (hereinafter referred to as Bed 1) and connects a second tank or bed 17 (hereinafter referred to as Bed 2) to the vacuum pump 12. In the second position, the valve 14 connects the air compressor 10 to tank 17 and at the same time connects tank 16 to the vacuum pump. It is thus apparent that the tanks are alternately pressurized and evacuated and that the compressor 10 operates continuously to feed air to one bed or the other, so that each bed is connected to the output of the compressor 10 for 50% of the time.

Each of the tanks is a cylindrical member, and in one particularly satisfactory embodiment the tank is about 5⅝ inches in diameter and 12 inches long. Each tank contains 9 inches of a molecular sieve material Type 5A overlying a 1½ inch layer of silica gel. There is thus a small plenum space at each end of the 12 inch tanks.

The air compressor and vacuum pump are driven by a small one-third horsepower motor which is adequate for the purpose.

The system includes an inter-tank connection line 18 containing a solenoid operated on-off valve 19 and restrictor 20. Whenever line 18 is opened by moving the solenoid valve 19 to its open position intercommunication between tanks 16 and 17 is established but the flow is very substantially limited by the restrictor 20 so that the tanks do not simply dump one into the other. The necessary restriction may be obtained by limiting the degree of opening of valve 19 if a separate element is found not to be required.

The output from tank 16 is taken also to a primary effluent line 21 and the output of tank 17 is taken to a primary effluent line 22. These two lines are interconnected through appropriate check valves 23 and 24 to the inlet of an oxygen-enriched gas accumulator 25 which evens out the flow of the system. A pressure regulator valve 26 is provided in the outlet line from the accumulator 25. A flow adjusting valve 27 is disposed in the line away from the regulator. If desired, a solenoid operated valve 28 may be interposed between the final output and the oxygen-enriched gas accumulator as a device which will cut off when the unit is shut down or in the event of power failure so that the oxygen-enriched gas that has been accumulated up to the time of shut down or power failure does simply not spill out to the atmosphere.

A flow meter device 30 is also in the output line from the oxygen-enriched gas accumulator and indicates the flow to the patient. The patient breathes from an output line 31 which is connected to an appropriate mask or cannula that is held in or over the patient's nose or by the patient or otherwise.

The essential solenoid operated valves in the system are the four-way solenoid operated valve 14 and the purge solenoid operated valve 19. The spill preventing cut-off valve 28 is an optional device. A single cycle timer 32 is provided to operate valves 14 and 19 in the cycle described below.

The timing cycle for the apparatus shown in FIG. 1 is quite critical for optimum results and is shown and described in connection with FIGS. 2 and 3 of the drawings.

As indicated in FIG. 2, the sequence of events of a preferred cycle is as follows:

Solenoid valve 14 connects Bed 1 to the compressor and Bed 2 to the vacuum pump and solenoid valve 19 is closed during the period from zero to 22 seconds. Bed 1 is thus being supplied with air from compressor 10 and previously adsorbed nitrogen is being removed from Bed 2 by the vacuum pump 12. At 20 to 24 seconds into the cycle solenoid valve 19 is energized and opened and final purging takes place from Bed 1 to Bed 2 through line 18 and restrictor 20. Solenoid valve 14 has not changed its position. Since Bed 1 has been building up an increasingly rich primary effluent stream, the final purging gas is very rich in oxygen and it has been found that the rich purging gas can accomplish the final nitrogen removal from Bed 2 in a matter of only 6 to 10 seconds or 20% to 33% of the interval during which Bed 1 has been connected to air compressor 10.

At the end of the 6 to 10 second purging gas flow period (30 seconds) solenoid valve 14 is reversed and Bed 1 is connected to vacuum pump 12 for 30 seconds.

Bed 1 is evacuated to remove most of the adsorbed nitrogen and comes down to a negative pressure; in a preferred execution to about 12 inches of mercury vacuum. After 20 to 24 seconds of evacuation of Bed 1 and pressurization of Bed 2 the solenoid operated valve 19 is opened and the final purging of Bed 1 takes place. This purging again is accomplished by the small volume of highly enriched gas from Bed 2. At the same time that valve 14 was reversed, (30 seconds) Bed 2 was put on stream and under pressure from compressor 10 and began to adsorb nitrogen from the passing air and, when pressure in the Bed exceeds the accumulator pressure, to discharge a primary effluent stream of oxygen enriched air.

FIG. 3 is a pressure-time diagram of the cycle outlined above for an output flow rate of about 2 liters per minute. The varying pressures in Bed 1 are shown above those for Bed 2. The diagram shows that, as is conventional, the Beds are operated alternately. There is a cyclical flow of enriched gas into the accumulator space 25.

As shown on the diagram the output of Bed 1 begins with the Bed at substantially atmospheric pressure and builds up for 22 seconds to a final pressure of 22 psi. gauge. During this interval Bed 2 is being evacuated to remove nitrogen. The final purge portion of this cycle then begins, but the Beds are interconnected through restriction 20 so that the pressure in Bed 1 falls only to about 16 psi. during the 6 to 10 second purge of Bed 2 by the highly enriched effluent stream from Bed 1. This reduction in pressure occurs because the purge gas flow rate and the product gas output rate exceed the compressor output. At 30 seconds solenoid operated valve 14 is reversed and Bed 1 is connected to vacuum pump 12 and its pressure falls to a negative pressure of 12 inches of mercury at 52 seconds at which time reverse high purity gas flow commences to complete the purging and the cycle is repeated.

Bed 2 in the meantime may be considered as being first in the evacuation portion of its cycle for 22 seconds, followed by purging for 8 seconds, followed by discharge for 22 seconds, etc. It will be noted that compressor 10 discharges constantly into one bed or the other without the interposition of an air storage tank.

As is common with systems of the character described, the concentration of oxygen in the effluent stream is reduced as the flow rate is increased. With the apparatus described above the concentration varies on a substantially straight line between 95% $O_2$ at 2 liters per minute to 58% $O_2$ at 10 liters per minute. This is substantially higher than similar devices now on the market and the increase in efficiency is due to the final short purge with a high concentration of oxygen in the purging stream coupled with the vacuum desorption. The prior art machines use a pressure equalizing line between the two beds as a part of the purging system which leads to a partial purge with poor gas a part of the cycle. This results in a decrease in efficiency. Reducing the pressure in the Bed being desorbed through the vacuum pump and its muffler greatly reduces the operating noise of the system as compared with known devices.

The foregoing description relates to a preferred embodiment of the invention. It is understood that the pressures and vacuums stated will vary significantly from unit to unit due to variations in time cycles, compressor or vacuum pump output characteristics, adsorption characteristics of the molecular sieve material, system volumes, etc.

What we claim is:

1. In a method of operating an oxygen enrichment system including two nitrogen adsorbing beds, an air compressor and a vacuum pump, comprising the steps of applying a continuous air stream under pressure from the compressor through one bed, removing a primary effluent stream of $O_2$ enriched gas from such one bed, simultaneously pulling a continuous vacuum on the other bed to partially purge such other bed by removing nitrogen, completing the purging and regeneration of such other bed by introducing high purity $O_2$ enriched gas from such one bed through such other bed while such other bed is under a vacuum and during the last 20% to 33% of the adsorption cycle cyclically alternating the supply of the air stream and the pulling of the vacuum on each of the two beds to simultaneously and continuously maintain each bed under pressure or vacuum whereby only one bed is under the supply of the air stream at any one time.

2. The method in accordance with claim 1 in which each of said two beds is connected to said air compressor for 50% of the time and said air compressor discharges continuously into one bed or the other.

* * * * *